(12) United States Patent
von der Wehd

(10) Patent No.: US 12,523,083 B2
(45) Date of Patent: Jan. 13, 2026

(54) DRIVE UNIT FOR MOTORISED ADJUSTMENT OF A CLOSURE ELEMENT OF A MOTOR VEHICLE

(71) Applicant: Brose Fahrzeugteile SE & Co. Kommanditgesellschaft, Bamberg, Bamberg (DE)

(72) Inventor: Rene von der Wehd, Ebern (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 60 days.

(21) Appl. No.: 18/714,167

(22) PCT Filed: Nov. 28, 2022

(86) PCT No.: PCT/EP2022/083474
§ 371 (c)(1),
(2) Date: Nov. 26, 2024

(87) PCT Pub. No.: WO2023/099399
PCT Pub. Date: Aug. 6, 2023

(65) Prior Publication Data
US 2025/0116148 A1    Apr. 10, 2025

(30) Foreign Application Priority Data
Dec. 3, 2021  (DE) ............... 10 2021 131 945.5

(51) Int. Cl.
*E05F 15/622*   (2015.01)

(52) U.S. Cl.
CPC ......... *E05F 15/622* (2015.01); *E05Y 2201/10* (2013.01); *E05Y 2201/21* (2013.01); *E05Y 2900/546* (2013.01)

(58) Field of Classification Search
None
See application file for complete search history.

(56) References Cited

U.S. PATENT DOCUMENTS 4,329,605 A * 5/1982 Angi .................... H02K 11/026
                                                              310/239
4,728,835 A * 3/1988 Baines .................. H02K 5/145
                                                              310/239
(Continued)

FOREIGN PATENT DOCUMENTS

CN        110017078 A   *  7/2019  ............ E05F 15/622
DE        202008016615       4/2010
(Continued)

OTHER PUBLICATIONS

"German Search Report," for German Patent Application No. 102021131945.5, mailed Mar. 30, 2023, 7 pages, no translation.
(Continued)

*Primary Examiner* — Catherine A Kelly
(74) *Attorney, Agent, or Firm* — Pauly, DeVries Smith & Deffner LLC

(57) ABSTRACT

A drive unit for the motor-driven adjustment of a closure element of a motor vehicle, wherein the drive unit has mechanical drive connections, which are linearly adjustable relative to each other, and a drive train, which is coupled to the drive connections, with an electric drive motor, wherein the drive motor has a motor shaft and a motor housing, wherein the motor housing is composed of a plurality of housing parts and is mounted in the drive unit via a decoupling element. It is proposed that the decoupling element is designed electrically conductively at least in sections and covers a transition region between the housing parts.

19 Claims, 3 Drawing Sheets

(56) References Cited

U.S. PATENT DOCUMENTS

| | | | | |
|---|---|---|---|---|
| 5,698,918 A * | 12/1997 | Shinoda | ............... | H02K 15/14 |
| | | | | 310/85 |
| 6,078,117 A * | 6/2000 | Perrin | ............... | H02K 5/1672 |
| | | | | 310/239 |
| 6,541,883 B2 * | 4/2003 | Uffelman | ............... | F04D 13/06 |
| | | | | 310/71 |
| 7,301,251 B2 * | 11/2007 | Cara | ............... | H02K 11/40 |
| | | | | 361/753 |
| 8,237,317 B2 * | 8/2012 | Bochen | ............... | E05F 15/622 |
| | | | | 310/67 R |
| 9,103,154 B2 * | 8/2015 | Sitzler | ............... | E05F 15/622 |
| 9,577,553 B2 * | 2/2017 | Eggeling | ............... | H02P 5/68 |
| 10,641,028 B2 * | 5/2020 | Takizawa | ............... | E05F 1/1058 |
| 11,332,969 B2 * | 5/2022 | Schmengler | ............... | E05F 5/025 |
| 12,221,821 B2 * | 2/2025 | Bittner | ............... | E05F 15/41 |

FOREIGN PATENT DOCUMENTS

| | | | | |
|---|---|---|---|---|
| DE | 102013211601 | | 12/2014 | |
| DE | 202019102493 | | 5/2019 | |
| DE | 102019130651 | | 5/2021 | |
| EP | 1795684 | | 6/2007 | |
| EP | 2907955 A1 * | | 8/2015 | ............ E05F 15/622 |
| JP | 2002247795 A * | | 8/2002 | ............... H02K 5/02 |
| WO | WO-2018066500 A1 * | | 4/2018 | ............. F16H 25/24 |
| WO | 2023099399 | | 6/2023 | |

OTHER PUBLICATIONS

"International Search Report," for PCT Application No. PCT/EP2022/083474, mailed Mar. 16, 2023, 5 pages.

* cited by examiner

DRIVE UNIT FOR MOTORISED ADJUSTMENT OF A CLOSURE ELEMENT OF A MOTOR VEHICLE

CROSS-REFERENCE TO RELATED APPLICATIONS

This application is a national stage application under 35 U.S.C. 371 of International Patent Application Serial No. PCT/EP2022/083474, entitled "DRIVE UNIT FOR MOTORISED ADJUSTMENT OF A CLOSURE ELEMENT OF A MOTOR VEHICLE," filed Nov. 28, 2022, which claims priority from German Patent Application No. DE 10 2021 131 945.5, filed Dec. 3, 2021, the disclosure of which is incorporated herein by reference.

FIELD OF THE TECHNOLOGY

Embodiments relate to a drive unit for the motor-driven adjustment of a closure element of a motor vehicle and to a closure element arrangement for a motor vehicle.

BACKGROUND

The known drive unit (WO 2019/105694 A1), on which some embodiments are based, is provided for the motor-driven adjustment of a tailgate of a motor vehicle by means of a drive motor. The engine rotational speed is controlled by a drive control system. The drive motor conventionally has a motor housing and, arranged therein, a stator and a rotor with a motor shaft.

SUMMARY

It is a challenge here to optimize the drive units with respect to the electromagnetic compatibility (EMC). Electromagnetic compatibility refers to the capability of a technical device not to interfere with other devices by means of undesirable electrical, magnetic or electromagnetic effects or to be interfered with by other devices. Depending on the specifications of the respective motor vehicle, the EMC requirements for the drive unit vary. In many cases, additional shielding elements such as enclosures or the like for drive motors are required to meet strict EMC requirements, thus increasing the number of components to be stored and the outlay on installation. This may also increase the amount of space required.

The problem on which some embodiments are based is to design and develop the known drive unit in such a way that the electromagnetic compatibility can be changed with little outlay on design.

The above problem is solved by various features provided herein.

The drive unit in question is used as part of the adjustment of a closure element of a motor vehicle. Such a drive unit may, for example, be part of a drive for a tailgate, a lid, a hood, a side door, a sliding door, a sunroof or the like of a motor vehicle. In this respect, the term "closure element" should be understood broadly here.

Various embodiments are based on the finding that transition regions between adjacent housing parts in drive motors are in many cases a source of EMC-relevant interference. In the case of the drive units in question, a decoupling element is provided for the mounting of the drive, which can be designed elastically in particular for the acoustic decoupling of the drive motor. The fundamental consideration is essentially to use the decoupling element additionally for improving the EMC properties.

In particular, it is proposed that the decoupling element is designed electrically conductively at least in sections and covers a transition region between the housing parts.

As a result, additional shielding elements are not absolutely necessary in the event of high EMC requirements. By using the decoupling element for the covering, drive units can also be easily equipped with or without additional EMC measures via the selection of the decoupling element installed. At the same time, the reduced number of components reduces the amount of space required.

Various embodiments of the motor housing with an end cap are provided, wherein the transition region, which is particularly relevant for the EMC properties, to the end cap is covered by means of the decoupling element. A configuration of the decoupling element with an end portion and side portion can be used with high reliability to substantially cover the transition region.

In various embodiments, the housing parts are assembled by a crimp connection, and therefore a particularly economical manufacturing method is used for the motor housing. Any gaps at the transition region or else provided crimp tabs are unproblematic for the EMC properties here because of the covering by the decoupling element.

Various embodiments relate to advantageous structures of the decoupling element. The use of an elastomer as described herein, as a result of which the decoupling element provides an optimized acoustic decoupling, can be particularly advantageous in some instances.

Various embodiments, according to which the end cap is designed at least partially electrically conductively and provided, for example, with an electrically conductive layer, can also be provided. In conjunction with the decoupling element, the drive motor can therefore be substantially completely shielded with little outlay.

In various embodiments, the decoupling element can also be designed for a ground connection. Since a ground connection element may be optional in the case of the drive units in question, various embodiments relate to releasable holding of a ground connection element by the decoupling element is particularly advantageous. In this case, a ground connection element can optionally be connected to the decoupling element by simple means, without the necessity of additional motor variants.

According to various embodiments, a closure element arrangement for a motor vehicle having a closure element and a proposed drive unit associated with the closure element is provided. Reference may be made to all the explanations regarding the drive unit.

Various embodiments provide a drive unit for the motor-driven adjustment of a closure element of a motor vehicle, wherein the drive unit has mechanical drive connections, which are linearly adjustable relative to each other, and a drive train, which is coupled to the drive connections, with an electric drive motor, wherein the drive motor has a motor shaft and a motor housing, wherein the motor housing is composed of a plurality of housing parts and is mounted in the drive unit via a decoupling element, wherein, the decoupling element is designed electrically conductively at least in sections and covers a transition region between the housing parts.

In various embodiments, an end cap and a side wall element are provided as housing parts, wherein the end cap is arranged in relation to a geometric shaft axis of the motor shaft on the end face of the side wall element, wherein the decoupling element has an end portion associated with the end cap and an adjacent side portion associated with the side wall element, said end portion and side portion covering the transition region between the end cap and side wall.

In various embodiments, the decoupling element is designed annularly and at least partially circumferentially surrounds the motor housing with respect to the geometric shaft axis.

In various embodiments, the housing parts are connected to each other by a crimp connection, and wherein the decoupling element covers the crimp connection. In some embodiments, at least one crimp tab belonging to the crimp connection.

In various embodiments, the decoupling element is made of a material composite or composite material with an electrically conductive material.

In various embodiments, the decoupling element has an elastomer element and an electrically conductive layer element, and/or wherein the decoupling element comprises an elastomer with embedded, electrically conductive elements.

In various embodiments, the end cap is designed at least in sections electrically conductively, in particular with an electrically conductive layer. In some embodiments, the end cap is designed as a brake element for a magnetic braking device for braking the motor shaft with a magnetic arrangement, and wherein the magnetic arrangement is arranged on the motor shaft for conjoint rotation and adjacent to the end cap.

In various embodiments, the decoupling element is arranged on a cable module side of the drive motor.

In various embodiments, the decoupling element has an attachment portion for a ground connection element. In some embodiments, a ground connection element is joined to the attachment portion.

In various embodiments, the ground connection element is held between the decoupling element and at least one of the housing parts. In some embodiments, the ground connection element is held releasably.

In various embodiments, the decoupling element has a feedthrough, which is axial with respect to the geometric shaft axis, for the ground connection element. In some embodiments, the feedthrough is provided with respect to the geometric shaft axis circumferentially or on a side of the decoupling element facing the motor shaft.

Various embodiments provide a closure element arrangement for a motor vehicle having a closure element and a drive unit associated with the closure element as described herein.

BRIEF DESCRIPTION OF THE DRAWINGS

Various aspects are explained in more detail below with reference to a drawing merely illustrating one exemplary embodiment. In the drawing

DETAILED DESCRIPTION

Figure 1:
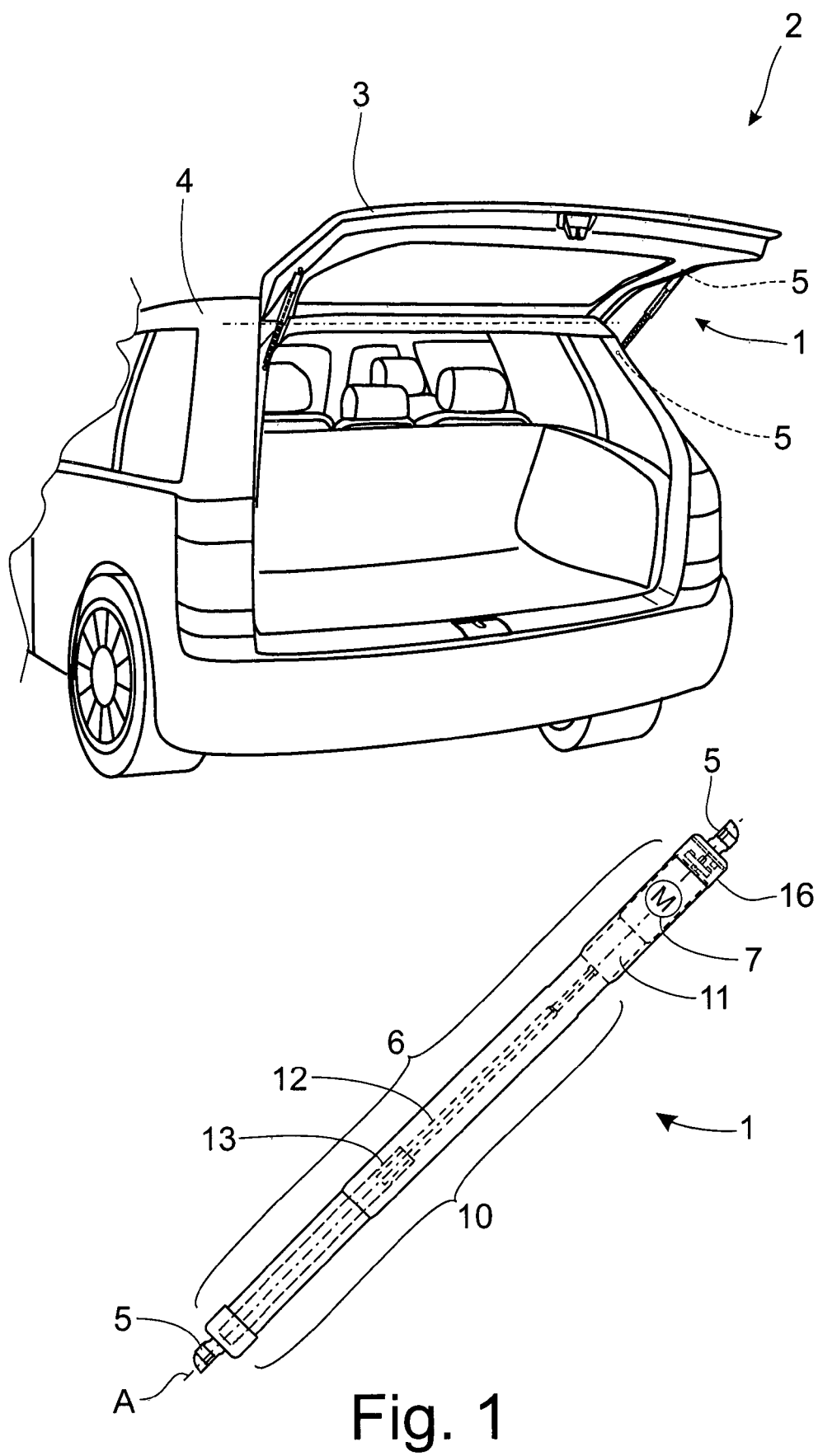
FIG. 1 shows the rear region of a motor vehicle with a proposed drive unit for the motor-driven adjustment of the closure element there.

The proposed drive unit 1 is associated with a closure element arrangement 2, for example a tailgate arrangement, which in turn is equipped with a closure element 3, here a tailgate. The closure element arrangement 2 is associated with a motor vehicle 4 (FIG. 1).

The closure element 3, as mentioned above, may also be another closure element 3 of a motor vehicle 4, in particular a sliding door or a side door. All of the explanations apply accordingly to other closure elements 3.

The drive unit 1 has mechanical drive connections 5, which are each coupled to the motor vehicle 4 and to the closure element 3, here the tailgate. The mechanical drive connections 5 are linearly adjustable relative to one another, as a result of which the distance between the drive connections 5 can be changed. By means of a linear adjustment of the drive connections 5, the closure element 3 can be adjusted relative to the motor vehicle 4.

The drive connections 5 are coupled to a drive train 6 of the drive unit 1, which is also shown in FIG. 1. The drive train 6 has an electric drive motor 7 with a motor shaft 8 and a motor housing 9, and a feed mechanism connected downstream of the electric drive motor 7 in terms of drive, in this case a spindle-spindle nut mechanism 10. An intermediate gear 11, for example a reduction gear, can be switched between the electric drive motor 7 and the spindle-spindle nut mechanism 10. The drive train 6 here can be designed to be drivable in reverse.

The spindle-spindle nut mechanism 10, which in a conventional manner per se comprises a spindle 12 and a spindle nut 13 meshing therewith, is provided for generating linear drive movements along a geometric spindle axis A between a retraction position and an extension position of the drive unit 1. The spindle 12 is coupled here via the electric drive motor 7 to one of the mechanical drive connections 5 and the spindle nut 13 to another of the mechanical drive connections 5. The spindle-spindle nut mechanism 10 thus causes the linear adjustment of the drive connections 5. The motor shaft 8 has a geometric shaft axis B, which can be aligned here coaxially to the geometric spindle axis A.

The motor housing 9 has a plurality of housing parts 14, which are assembled and thus mechanically connected to each other. A mechanical connection comprises force-fitting, form-fitting and integrally bonded connections. The motor housing 9 takes on enclosing other motor components such as stator, rotor and brush arrangement, which are not further illustrated in the drawing. The motor housing 9 thus provides an at least partial shielding of electric, magnetic and/or electromagnetic fields, which are decoupled from the drive motor 7, with respect to the surroundings of the drive motor 7.

A decoupling element 15 is provided, via which the motor housing 9 is mounted in the drive unit 1. In particular, the decoupling element 15 is arranged at least partially between the drive housing and an outer wall 16 of the drive unit 1. It can be the case here that, via the holding by means of the decoupling element 15, there is the effect that a direct mechanical contact between the drive housing and the outer wall 16 of the drive unit 1 is avoided. On the contrary, there is only an indirect mechanical contact between the motor housing 9 and the outer wall 16 via the decoupling element 15.

The decoupling element 15 can have elastic properties which lead to a substantial acoustic decoupling of the drive motor 7 from further components of the drive unit 1, here the outer wall 16.

It is now essential that the decoupling element 15 is designed electrically conductively at least in sections and covers a transition region 17 between the housing parts 14.

The transition region 17 is understood as meaning that portion of the outer surface of the motor housing 9 in which the housing parts 14 are adjacent to one another. With the covering of the transition region 17, an at least partial shielding of the transition region 17 is achieved here, with electric, magnetic and/or electromagnetic fields occurring at the transition region 17 being at least partially suppressed with the covering. In various embodiments, the decoupling element 15 completely covers the transition region 17.

The decoupling element 15 may also be designed only partially electrically conductively. In various embodiments, however, the decoupling element 15 is designed electrically conductively at least in portions to be associated with the transition region 17.

Further illustrated in the drawing, it can be provided that an end cap 18 and a side wall element 19 are provided as housing parts 14, and that the end cap 18 is arranged in relation to the geometric shaft axis B of the motor shaft on the end face of the side wall element 19.

The side wall element 19 is in particular a tubular housing portion, which is provided for example with a cylindrical cross section and in particular has axial symmetry about the geometric shaft axis B. In various embodiments, the side wall element 19 has a pot-shaped structure in which motor components are arranged. In various embodiments, the side wall element 19 is designed electrically conductively and formed, for example, from a shaped metal sheet. The end cap 18 is mechanically connected to the side wall element 19, thus forming the transition region 17. The transition region 17 is located here circumferentially at an end of the side wall element 19 that is axial with respect to the geometric shaft axis B.

Figure 2:
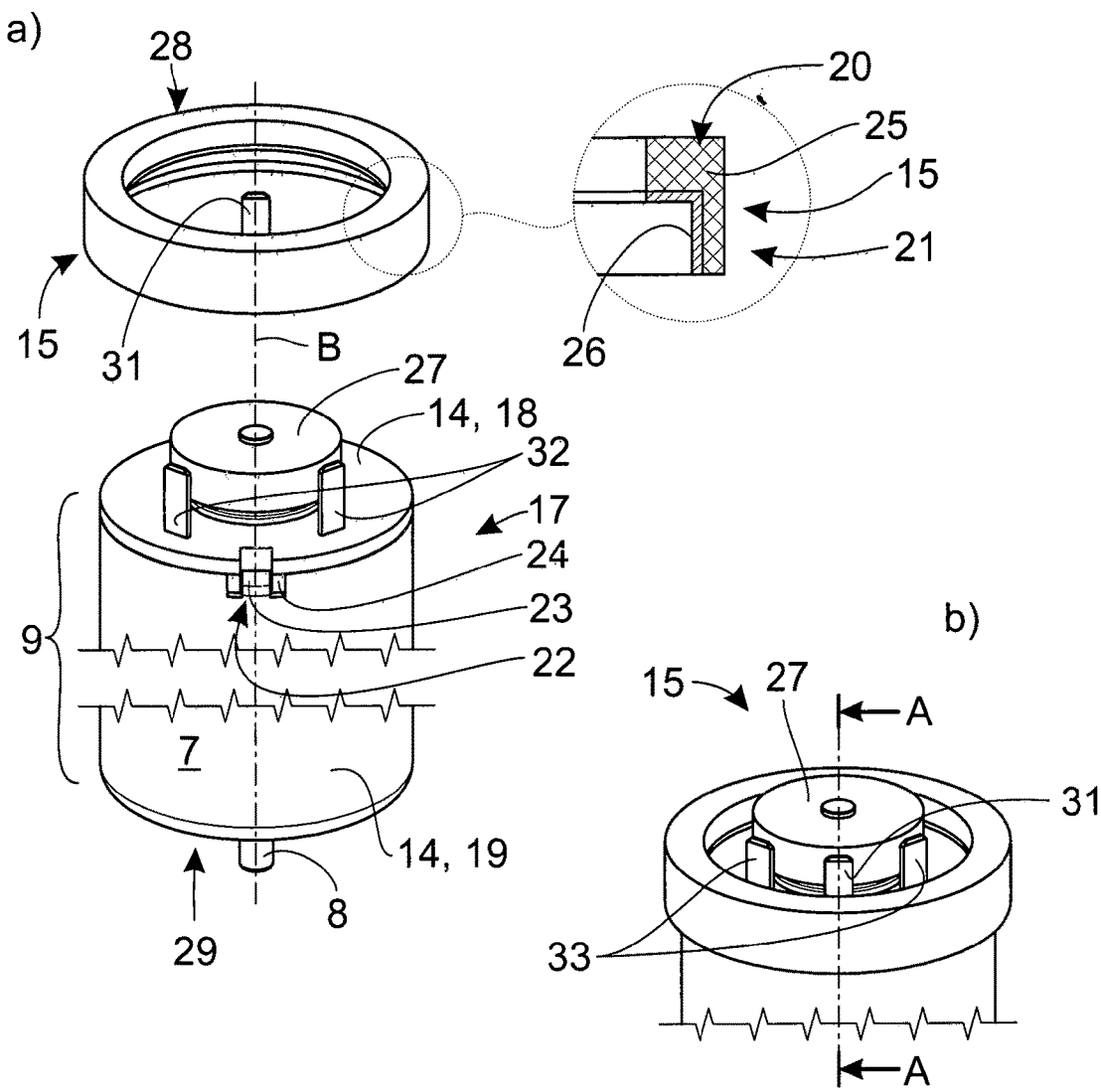
FIG. 2 shows the drive motor of the drive unit from FIG. 1 with a) a separately illustrated decoupling element and b) with an attached decoupling element in a first embodiment in a perspective illustration and also in cross section.
Figure 2:
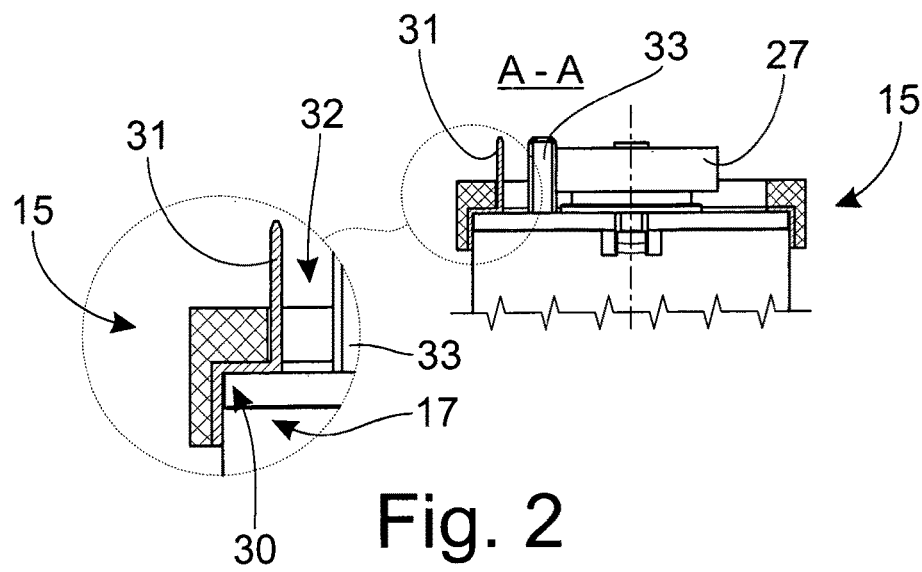
Figure 3:
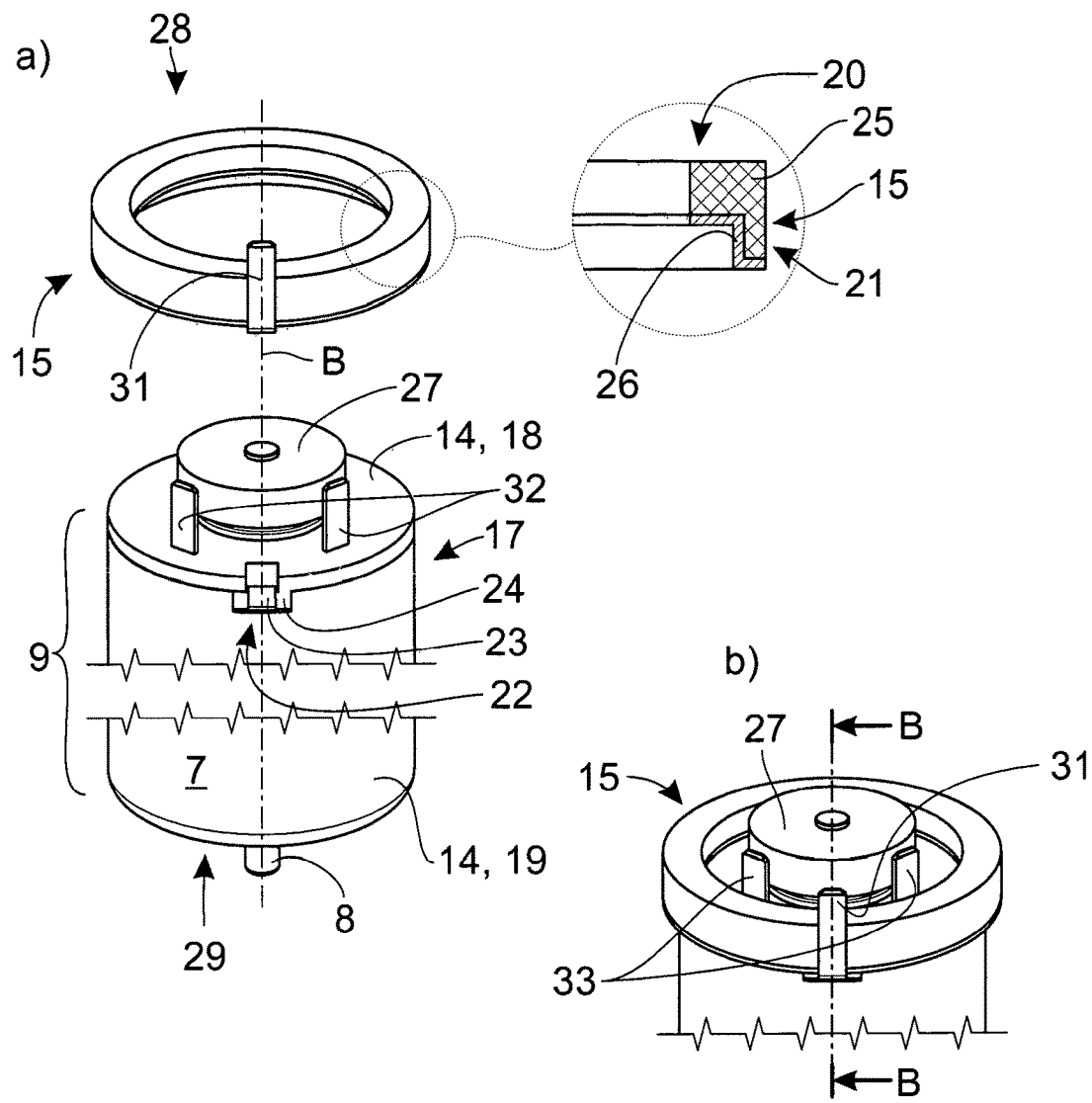
FIG. 3 shows the drive motor of the drive unit from FIG. 1 with a) a separately illustrated decoupling element and b) with an attached decoupling element in a second embodiment in a perspective illustration and also in cross section.
Figure 3:
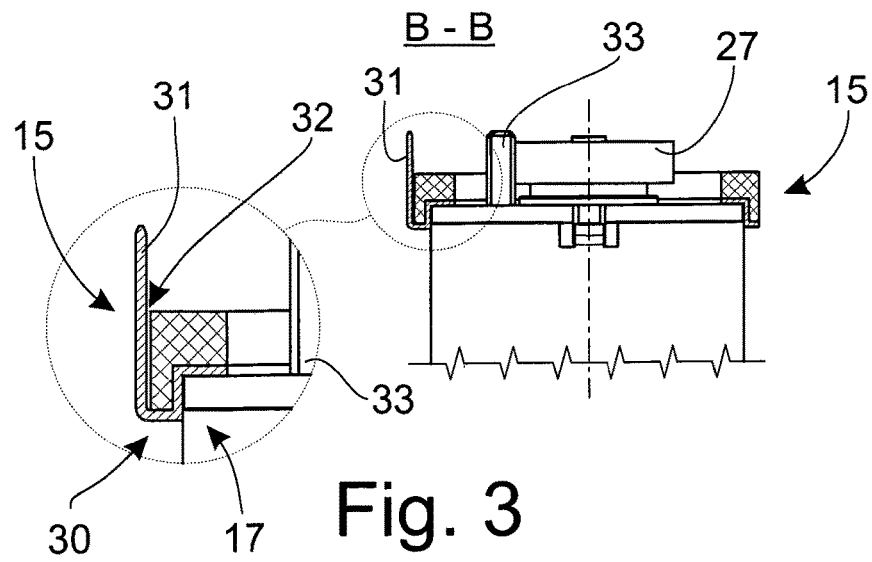

As illustrated in FIGS. 2 and 3, the decoupling element 15 can have an end portion 20 associated with the end cap 18 and a side portion 21 which is adjacent thereto and is associated with the side wall element 19. In particular, the end portion 20 and side portion 21 are dimensioned such that the decoupling element 15 in a state attached to the motor housing 9 (FIGS. 2b) and 3b)) is in flat mechanical contact with the respective housing parts 14. The end portion 20 and side portion 21 together here cover the transition region 17 from the end cap 18 to the side wall.

It is further provided here that the decoupling element 15 can be designed annularly and at least partially circumferentially surrounds the motor housing 9 with respect to the geometric shaft axis B.

An "annular form" is understood here as meaning a circumferentially closed form of the decoupling element 15, which is not necessarily designed in a circular form. In various embodiments, the annular form is instead adapted to the respective outer contour of the side wall element 19. Here, however, for the cylindrical side wall element 19, a section-by-section cylindrical decoupling element 15 is provided.

In various embodiments, an inner contour, in particular an inner diameter, of the decoupling element 15 is adapted to an outer contour, in particular to an outer diameter, of the side wall element 19. In various embodiments, an outer contour, in particular an outer diameter, of the decoupling element 15 is adapted to an inner contour, in particular an inner diameter, of the outer wall 16 of the drive unit 1. "Adapted" contours and diameters can be understood here as meaning approximately the same dimensions. An adaptation to an oversize of the decoupling element 15, which thus, for example, enters into a force-fitting connection with the motor housing 9 and/or the outer wall 16, is also conceivable.

It is further provided here that the housing parts 14 are connected to each other by a crimp connection 22, and that the decoupling element 15 covers the crimp connection 22. In various embodiments, at least one crimp tab 23 belonging to the crimp connection 22.

Here, crimp tabs 23 provided on the side wall element 19 engage in corresponding crimp recesses 24 on the end cap 18. The side portion 21 has an axial extent with respect to the geometric shaft axis B, which extends beyond the crimp tab 23 and thus furthermore can bring about a complete covering of the crimp connection 22 in the attached state (FIGS. 2b) and 3b)). Other embodiments of the crimp connection 22 are conceivable.

It is further provided here that the decoupling element 15 can be made of a material composite or composite material with an electrically conductive material.

The material composite or composite material can be formed here by an insulating base material, which provides, for example, elastic properties for the decoupling, and the electrically conductive material, which is used for the shielding.

In the embodiments illustrated, it is provided that the decoupling element 15 has an elastomer element 25 and an electrically conductive layer element 26.

The layer element 26 can be formed here as a separate component from the elastomer element 25, for example as a metal shaped part, which is connectable to the elastomer element 25. In particular, the layer element 26 of the elastomer element 25 is releasably designed, and therefore the layer element 26 is inserted or omitted as required.

In a further embodiment, the layer element 26 is a metallic coating applied to the elastomer element 25. As furthermore illustrated in FIGS. 2a) and 3a), the layer element 26 here extends on a side of the decoupling element 15 facing the housing parts 14.

According to an embodiment, not illustrated, the decoupling element 15 comprises an elastomer with embedded, electrically conductive elements. For example, these are metallic embedded particles that form an electrically conductive network in the elastomer. However, other electrically conductive materials with elastic properties that cause decoupling are also conceivable for the decoupling element 15.

In various embodiments, it is provided that the end cap 18 is designed at least in sections electrically conductively, in particular with an electrically conductive layer.

It is conceivable to form the end cap 18 from a metallic material. In various embodiments, however, the end cap 18 has a base body consisting of an insulator, in particular of plastic, which is provided with the layer. The layer may be partially metallic or completely formed from a metal. For example, the layer may be applied using the chemical vapor deposition (CVC) method. It is also possible to produce a layer by means of one of the methods from the series of indirect metallization, plating, painting, vacuum metallization or injection molding methods. In combination with the decoupling element 15, a substantially complete shielding of the drive motor 7 can be achieved.

In various embodiments, it is furthermore provided that the end cap 18 is designed as a brake element for a magnetic braking device for braking the motor shaft 8 with a magnetic arrangement 27, and that the magnetic arrangement 27 is arranged on the motor shaft 8 for conjoint rotation and adjacent to the end cap 18.

In various embodiments, the brake element and magnetic arrangement 27 interact in the manner of a hysteresis brake. A magnetic field going back to the magnetic arrangement 27 magnetizes the layer here in such a way that a braking force or a braking torque acts on the motor shaft 8. If the magnetic arrangement 27 is rotated about the geometric shaft axis B of the motor shaft 8, a portion of the layer is continuously remagnetized, thus generating the braking force. With the arrangement of the magnet arrangement 27 on the motor shaft 8, an improved shielding in the region of the motor shaft 8 on the end cap 18 can also be brought about.

It is further provided here that the decoupling element 15 can be arranged on a cable module side 28 of the drive motor 7.

The drive motor 7 has a cable module side 28 facing a cable module and an output side 29 facing the spindle-spindle nut mechanism 10. The decoupling element 15 is thus arranged on that side of the drive motor 7 which faces away from the spindle-spindle nut mechanism 10. The spindle-spindle nut mechanism 10 or an intermediate gear 11 can then be connected directly along the geometric shaft axis B to the drive motor 7.

The drive motor 7 can be supplied with power and activated via the cable module. A drive control system, not shown here, which is provided for this purpose may be part of the drive unit 1 or separately arranged in the motor vehicle 4. In particular, the drive control system of the drive unit 1 may also be part of a higher-level vehicle control system of the motor vehicle 4.

At the same time, the decoupling element 15 is arranged in the region of the cable module, as a result of which it can also be contacted via the cable module. In various embodiments, it is provided that the decoupling element 15 has an attachment portion 30 for a ground connection element 31, such as that a ground connection element 31 is joined to the attachment portion 30.

The ground connection element 31 is provided for electrical contact with the cable module for providing a reference potential, such as the ground potential, as a result of which the shielding can be improved. Via the electrically conductive configuration of the decoupling element 15, the reference potential can also be provided via electrical contact with the decoupling element 15 for the housing parts 14, here for the end cap 18 and the side wall element 19.

The attachment portion 30 is a portion of the decoupling element 15, here of the layer element 26, which is designed for electrical contact with a ground connection element 31, for example a connection pin.

In particular, the contacting is brought about by joining and thus via an integrally bonded connection, for example by soldering, spot welding and/or a conductive adhesive connection. The ground connection element 31 can thus be joined to the decoupling element 15, if required, or the decoupling element 15 can also be installed without a ground connection element 31. However, a one-piece configuration of the ground connection element 31 and decoupling element 15 is also conceivable, with, for example, the ground connection element 31 being a formation of the layer element 26.

In various embodiments, it is provided that the ground connection element 31 is held between the decoupling element 15 and at least one of the housing parts 14.

In various embodiments, the ground connection element 31 is held with a force fit between the decoupling element 15 and the housing parts 14, this being indicated in FIG. 2*b*). Here, the connection between the ground connection element 31 and the decoupling element 15 can be further stabilized. It is also conceivable that the ground connection element 31 is held releasably.

In various embodiments, the decoupling element 15 has a feedthrough 32, which is axial with respect to the geometric shaft axis B, for the ground connection element 31.

Via the feedthrough 32, the ground connection element 31 can reach from an inside of the decoupling element 15, which faces the housing parts 14 in the axial direction in relation to the geometric shaft axis B, to the cable module side 28.

In the embodiment illustrated in FIG. 2, the feedthrough 32 is provided on a side of the decoupling element 15 facing the motor shaft 8. In particular, the ground connection element 31 can thus be arranged in the vicinity of further connection elements 33, which are used for the electrical contacting of the drive motor 7, as a result of which the contacting with a cable module is simplified.

In the embodiment illustrated in FIG. 3, the feedthrough 32 is provided circumferentially with respect to the geometric shaft axis B. In particular, even in the case of an omission of the ground connection element 31, a substantially complete shielding by the decoupling element 15 is thereby ensured.

In addition, according to a further teaching, a closure element arrangement 2 for a motor vehicle 4 having a closure element 3 and a proposed drive unit 1 associated with the closure element 3 is provided.

The invention claimed is:

1. A drive unit for the motor-driven adjustment of a closure element of a motor vehicle, wherein the drive unit comprises:
   mechanical drive connections, which are linearly adjustable relative to each other, and
   a drive train, which is coupled to the drive connections, with an electric drive motor, wherein the drive motor comprises a motor shaft and a motor housing, wherein the motor housing is composed of a plurality of housing parts and is mounted in the drive unit via a decoupling element,
   wherein, the decoupling element is designed electrically conductively at least in sections and covers a transition region between the housing parts.

2. The drive unit as claimed in claim 1, wherein the decoupling element is arranged on a cable module side of the drive motor.

3. A closure element arrangement for a motor vehicle comprising a closure element and a drive unit associated with the closure element as claimed in claim 1.

4. The drive unit as claimed in claim 1, wherein the plurality of housing parts comprises an end cap and a side wall element, wherein the end cap is arranged in relation to a geometric shaft axis of the motor shaft on the end face of the side wall element.

5. The drive unit as claimed in claim 4, wherein the decoupling element is designed annularly and at least partially circumferentially surrounds the motor housing with respect to the geometric shaft axis.

6. The drive unit as claimed in claim 4, wherein the housing parts are connected to each other by a crimp connection, and wherein the decoupling element covers the crimp connection.

7. The drive unit as claimed in claim 4, wherein the decoupling element has an end portion associated with the end cap and an adjacent side portion associated with the side wall element, said end portion and side portion covering the transition region between the end cap and side wall.

8. The drive unit as claimed in claim 4, wherein the housing parts are connected to each other by a crimp connection, and wherein the decoupling element covers the crimp connection, wherein at least one crimp tab belonging to the crimp connection.

9. The drive unit as claimed in claim 4, wherein the end cap is designed at least in sections electrically conductively with an electrically conductive layer.

10. The drive unit as claimed in claim 4, wherein the end cap is designed at least in sections electrically conductively.

11. The drive unit as claimed in claim 10, wherein the end cap is designed as a brake element for a magnetic braking device for braking the motor shaft with a magnetic arrangement, and wherein the magnetic arrangement is arranged on the motor shaft for conjoint rotation and adjacent to the end cap.

12. The drive unit as claimed in claim 1, wherein the decoupling element is made of a material composite or composite material with an electrically conductive material.

13. The drive unit as claimed in claim 12, wherein the decoupling element has an elastomer element and an electrically conductive layer element, and/or wherein the decoupling element comprises an elastomer with embedded, electrically conductive elements.

14. The drive unit as claimed in claim 1, wherein the decoupling element comprises an attachment portion for a ground connection element.

15. The drive unit as claimed in claim 14, wherein a ground connection element is joined to the attachment portion.

16. The drive unit as claimed in claim 15, wherein the ground connection element is held between the decoupling element and at least one of the housing parts.

17. The drive unit as claimed in claim 16, wherein the ground connection element is held releasably.

18. The drive unit as claimed in claim 1, wherein the decoupling element has a feedthrough, which is axial with respect to the geometric shaft axis, for the ground connection element.

19. The drive unit as claimed in claim 18, wherein the feedthrough is provided with respect to the geometric shaft axis circumferentially or on a side of the decoupling element facing the motor shaft.

* * * * *